(12) United States Patent
Layton, Jr.

(10) Patent No.: US 6,362,421 B1
(45) Date of Patent: Mar. 26, 2002

(54) PROTECTIVE JUNCTION BOX

(75) Inventor: Russell K. Layton, Jr., Menlo Park, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 0 days.

(21) Appl. No.: 09/300,295

(22) Filed: Apr. 27, 1999

(51) Int. Cl.[7] .................................................. H01J 5/00
(52) U.S. Cl. ......................................... 174/50; 361/641
(58) Field of Search ............................... 174/50, 50.52, 174/50.53, 65 R, 59, 60, 135, 52.2; 220/66, 67, 174, 241, 242; 439/76.1; 361/641, 752, 826, 827, 828

(56) References Cited

U.S. PATENT DOCUMENTS

| | | | |
|---|---|---|---|
| 4,873,600 A | * 10/1989 | Vogele | 361/426 |
| 5,034,856 A | * 7/1991 | Cook et al. | 361/424 |
| 5,378,174 A | * 1/1995 | Brownlie et al. | 439/709 |
| 5,381,304 A | * 1/1995 | Theroux et al. | 361/706 |
| 5,594,199 A | * 1/1997 | Ciaccio | 174/35 R |
| 6,127,627 A | * 10/2000 | Daoud | 174/50 |
| 6,242,697 B1 | * 6/2001 | Gerken et al. | 174/65 R |
| 6,262,366 B1 | * 7/2001 | Ichikawa et al. | 174/50 |
| 6,291,767 B1 | * 9/2001 | Beecher et al. | 174/50 |

* cited by examiner

Primary Examiner—Dean A. Reichard
Assistant Examiner—Adolfo Nino
(74) Attorney, Agent, or Firm—Wagner, Murabito & Hao LLP

(57) ABSTRACT

The junction box of the present invention allows a user to couple multiple electronic devices to a primary electronic device. The junction box includes a housing assembly made up of an upper housing and a lower housing. The upper housing fits over the lower housing so as to form an enclosure. A seal assembly forms a seal between the upper housing and the lower housing. The upper housing extends outward on one side so as to form an overhanging portion and an opening. The overhanging portion, along with the seal assembly prevents fluids, dust and foreign particles from entering the enclosure. A circuit board is disposed in the enclosure that is coupled to a primary electrical cable. The primary electrical cable connects to the back of a primary electronic device. Electronic devices that are to be coupled to the primary electronic device are coupled to the junction box via cables that connect to each electrical device and connect to the circuit board. These electrical cables extend through the opening and under the overhanging portion of the upper housing.

11 Claims, 6 Drawing Sheets

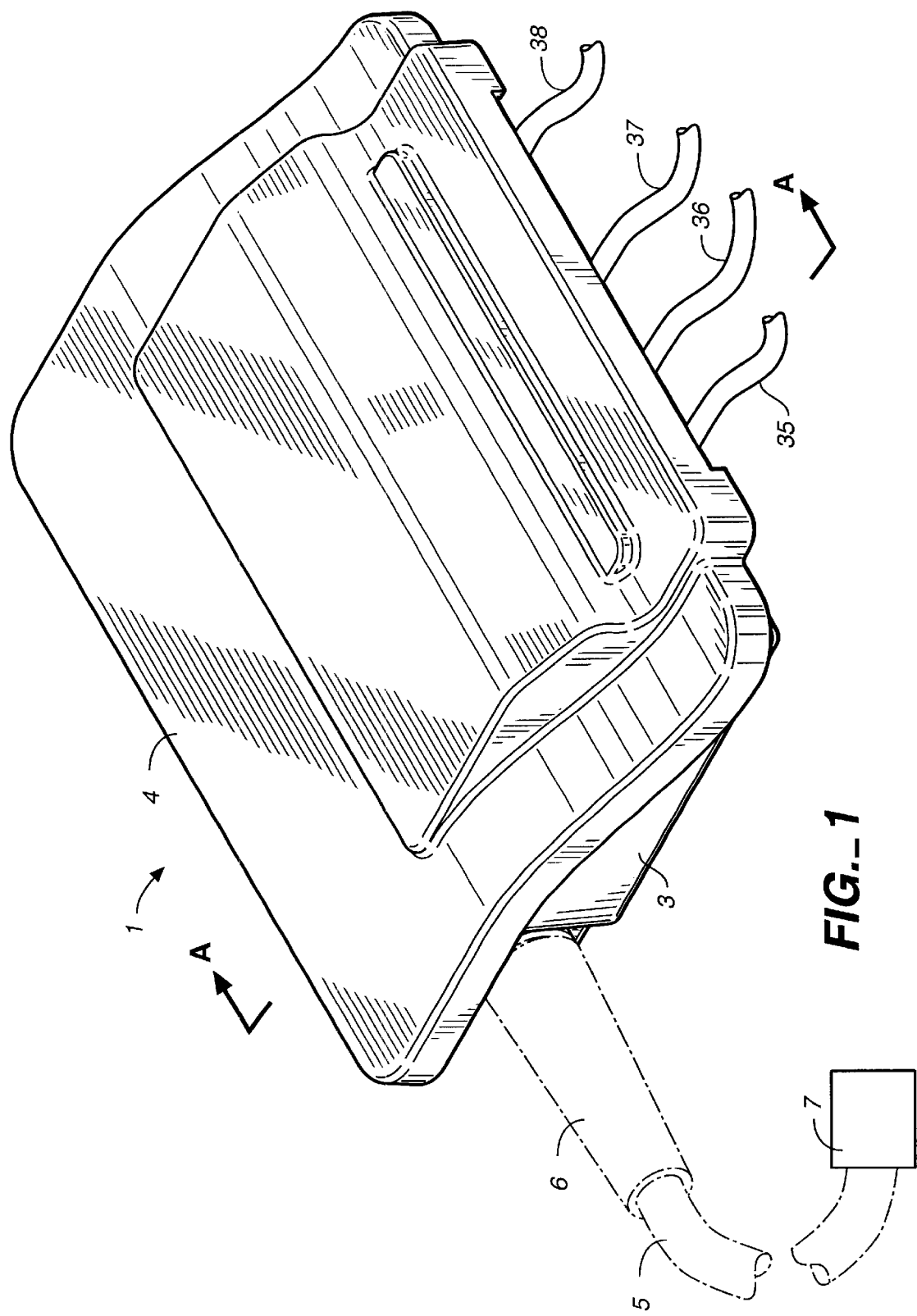
FIG._1

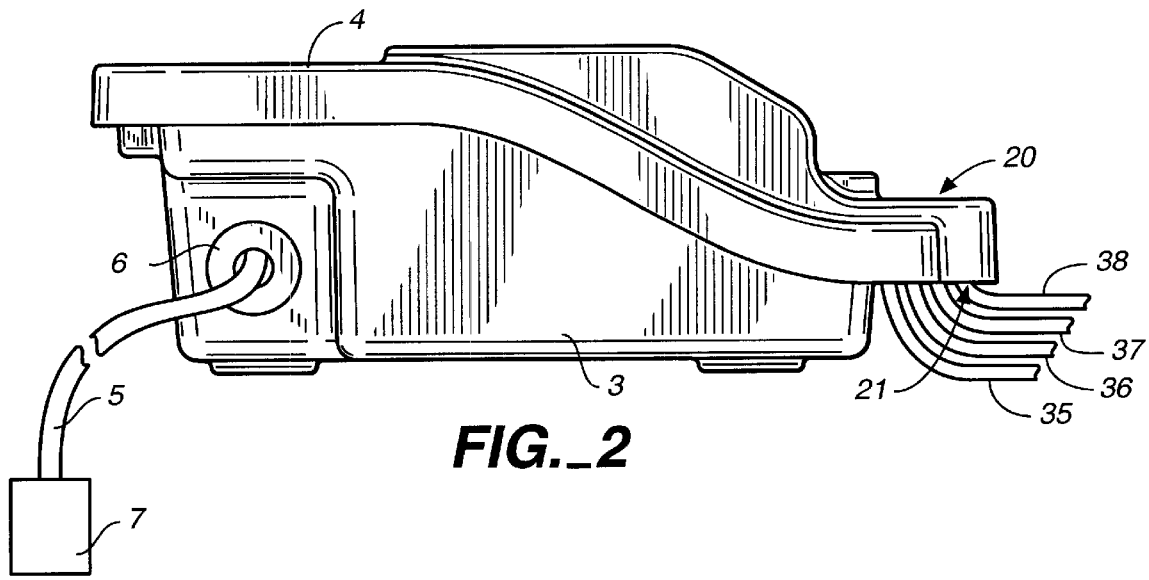
FIG._2
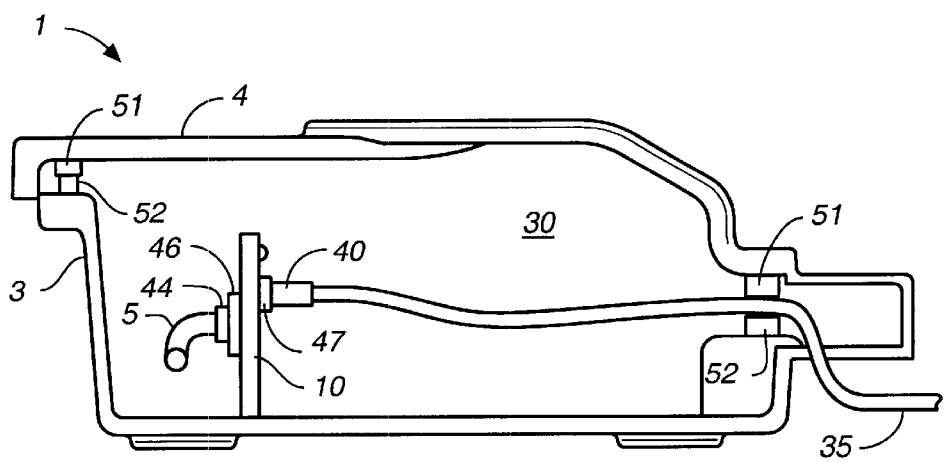
FIG._4

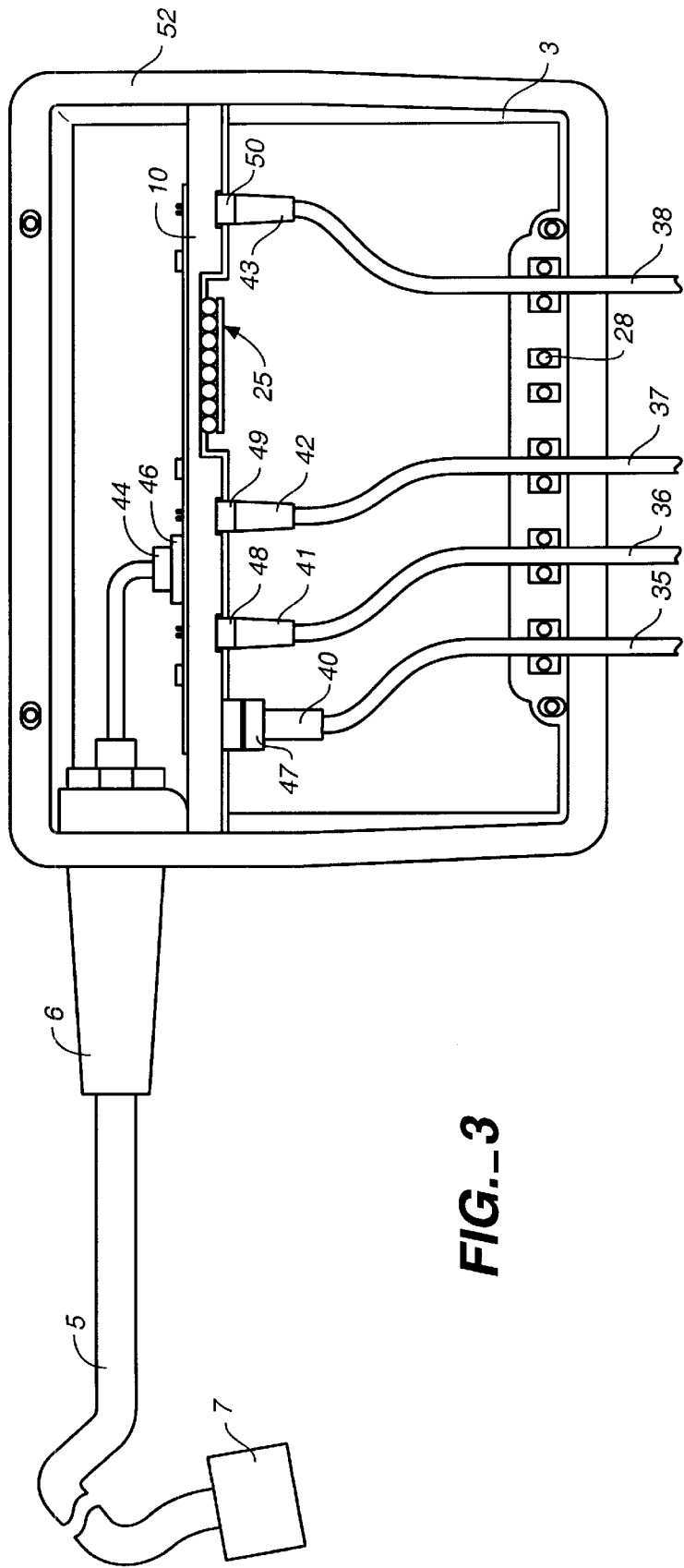
FIG._3

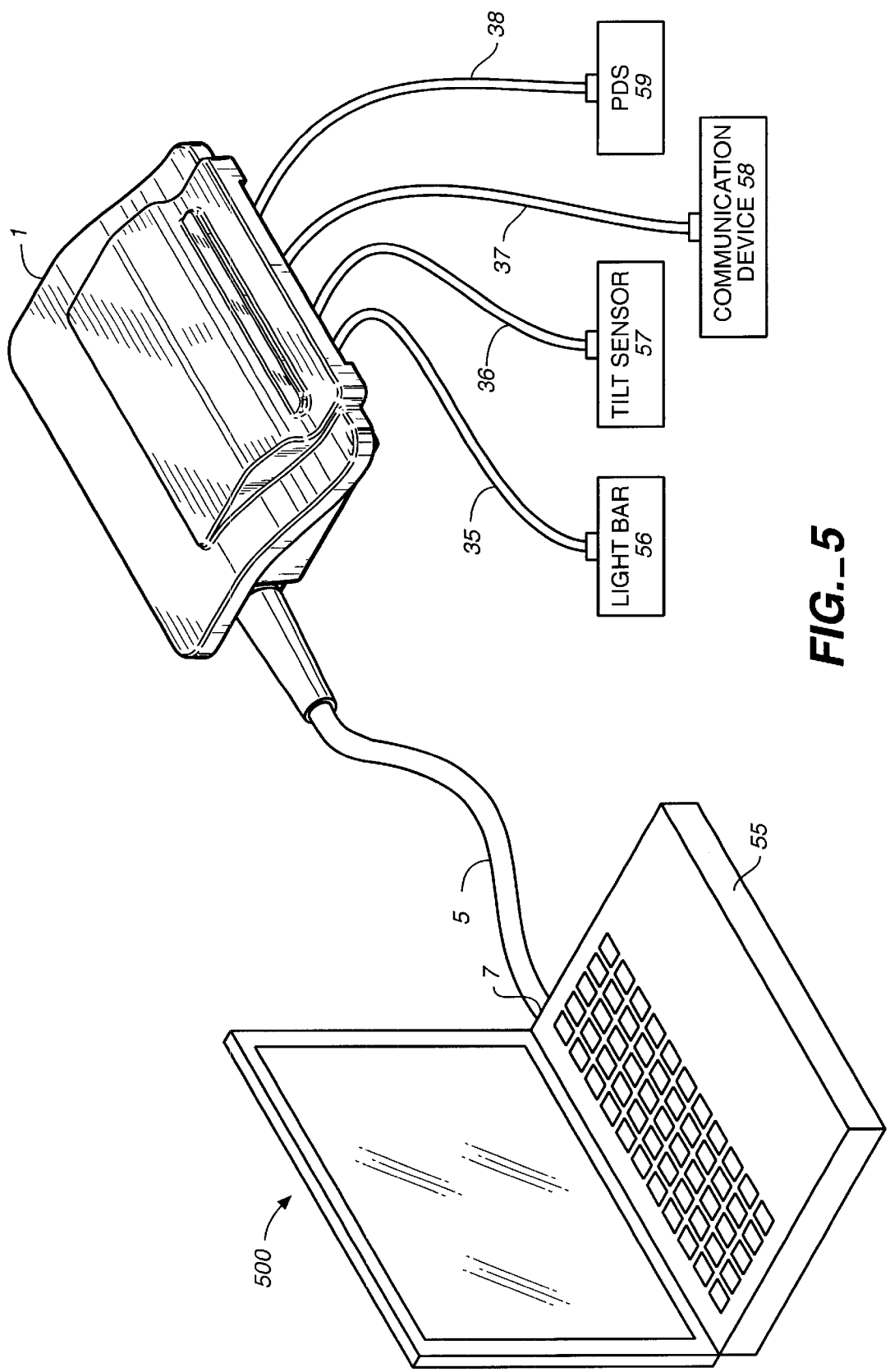
FIG._5

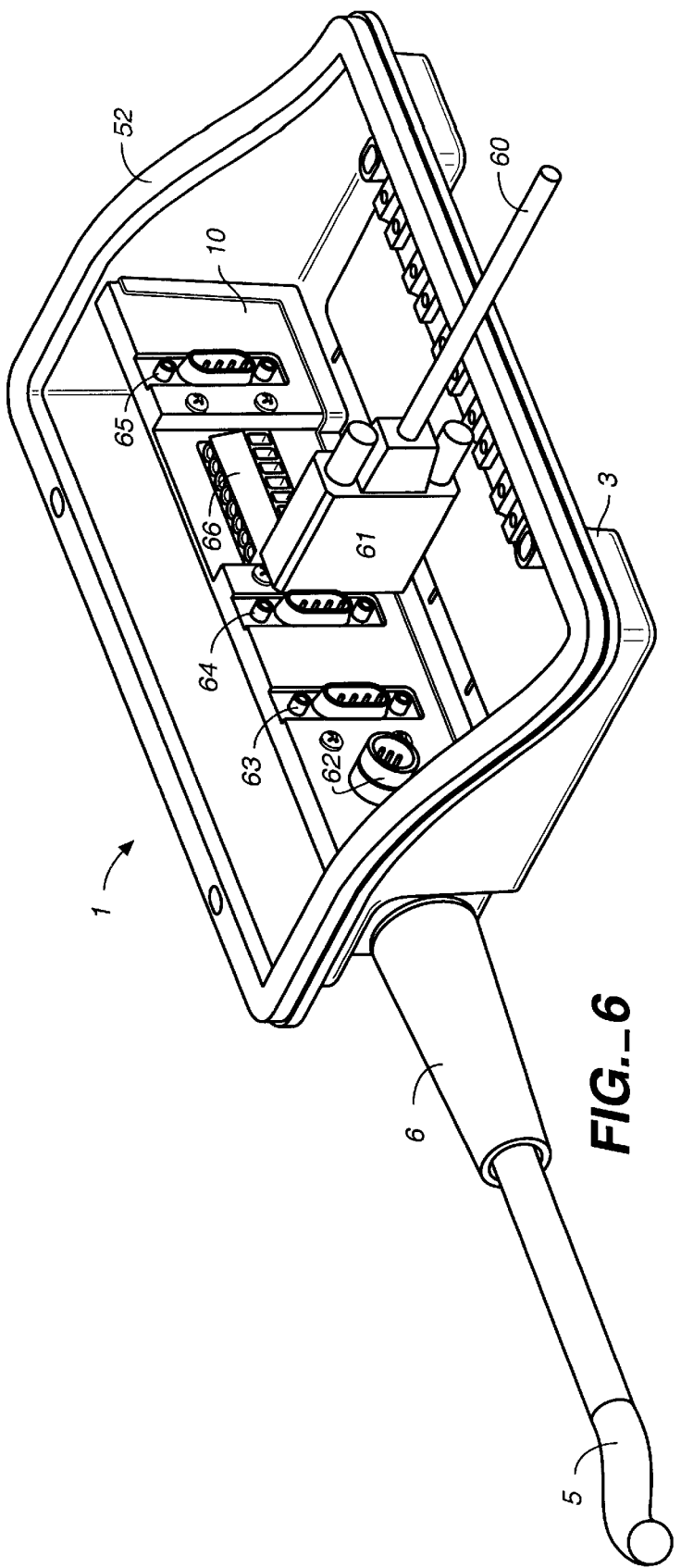
FIG._6

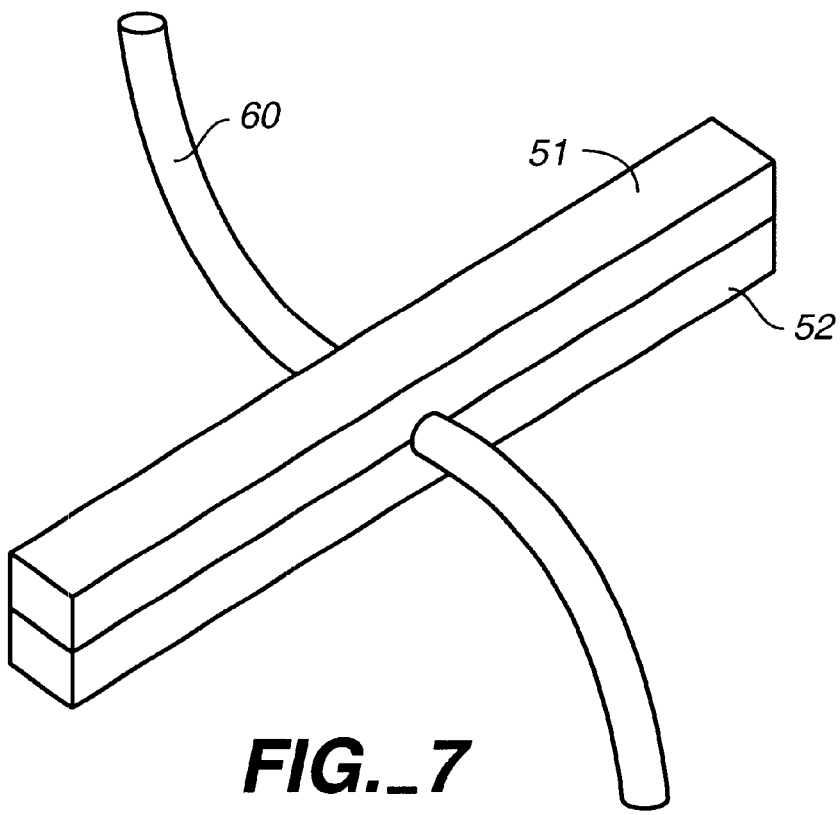
FIG._7
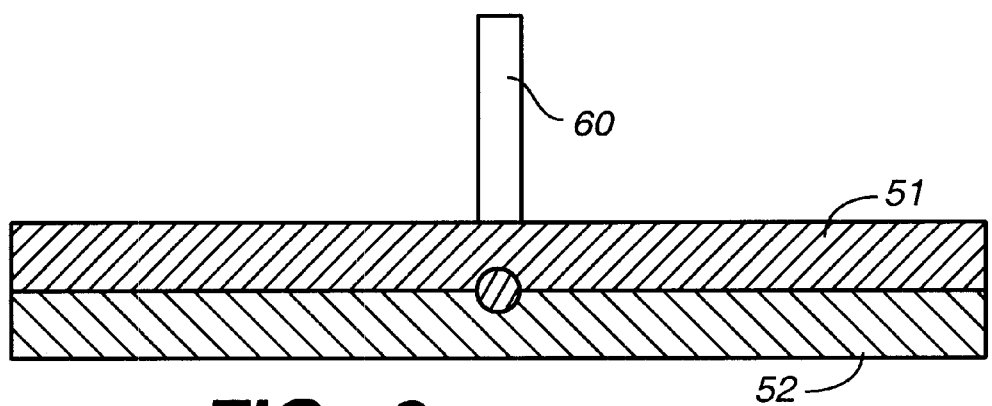
FIG._8

PROTECTIVE JUNCTION BOX

TECHNICAL FIELD

The present invention generally pertains to the field of electronic devices. More particularly, the present invention is related to a junction box for coupling electronic devices.

BACKGROUND ART

Position Determination System (PDS) devices such as devices that determine position using the satellites of the US Global Positioning System typically include a GPS antenna, a GPS receiver, a GPS processor, and a data storage device. Signals from the GPS are received by the GPS antenna, processed by the GPS receiver and position is determined by the GPS processor. The GPS processor then couples the determined position to a device that uses the determined position in some manner. Typically, computing devices such as, computers, laptop computers, Personal Digital Assistant (PDA) devices, handheld personal computers, etc. use position information.

Systems that include a computing device and a PDS typically include multiple component parts that must be electronically coupled to the computing device. Typically, such systems include from three to six cables that must be independently coupled to the back of the computing device. This produces a complex maze of cables and connectors at the back of the computing device. This maze of cables and connectors makes the system, and in particular, the computing device difficult to handle and operate.

In addition to being awkward and difficult to handle, such prior art systems experience failures and disconnects that result from the many cables and connectors being coupled to the computing device. For example, when a laptop computer is being used, the cables can get tangled and can be easily disconnected from the back of the computer as a result of normal operation and usage. That is, attempts to move the laptop computer and/or some or all of the connected devices often may pull on cables, resulting in disconnects or tangles in the cables.

Other problems that result from coupling cables to the back of the computer include shorts and disconnects resulting from rain, condensation, dust, and foreign particles. These problems are particularly troublesome in applications where exposure to the elements is required such as in surveying applications and precision farming applications.

Typically, prior art systems that are exposed to the elements use hermetically sealed components. Such systems are expensive due to the high cost of hermetic connectors, hermetic connector receptacles, hermetic containers, etc. In addition, when cables that are coupled to a hermetically sealed box via hermetic connectors are stepped on, failure of the hermetic seal often results.

What is needed is a method and apparatus that will allow a user to couple multiple electronic devices to a primary electronic device. Also, a method and apparatus is needed for coupling the component parts of a system that includes a PDS and a computing device. Still another need exists for a device that meets the above-listed needs and that is inexpensive. Yet another need exists for a method and apparatus that meets the above needs and provides good electrical contact in environments that include moisture, dust and foreign particles. The present invention provides a solution to the above needs.

DISCLOSURE OF THE INVENTION

The method and apparatus of the present invention allows a user to couple multiple electronic devices to a primary electronic device. The junction box of the present invention and method of coupling multiple electronic devices to a primary electronic device is inexpensive and provides good electrical contact in environments that include moisture, dust and foreign particles.

A junction box and a method of coupling multiple electronic devices to a primary electronic device are disclosed. In one embodiment, the junction box includes a housing assembly. The housing assembly includes an upper housing and a lower housing. The upper housing fits over the lower housing so as to form an enclosure. The junction box also includes a seal assembly. The seal assembly includes an upper housing seal and a lower housing seal. The upper housing seal attaches to the upper housing and the lower housing seal attaches to the lower housing. The upper housing seal and the lower housing seal meet when the upper housing is placed over the lower housing and form a sealed enclosure. In addition, the edges of the upper housing form a lip that helps prevent water, dust and foreign particles from entering the enclosure.

The upper housing extends outward on one side so as to form an overhanging portion. The overhanging portion, along with the sealed enclosure prevents shorts and disconnects. That is, the overhanging portion prevents water, dust and foreign particles from entering the enclosure.

A circuit board is disposed in the enclosure that is coupled to a primary electrical cable. The primary electrical cable connects to the back of an electronic device such as, for example a computer. Electronic devices that are to be coupled to the computing device are coupled to the junction box. More particularly, cables that connect to each electrical device are connected to the circuit board of the junction box. The electrical cables extend between the upper housing and the lower housing and exit the junction box under the overhanging portion of the upper housing.

The junction box of the present invention is easily configurable to accept different input configurations. Different configurations are obtained by inserting a different circuit board that is adapted to receive the desired cables. The electrical cables that connect to the various electronic devices are then coupled to the new circuit board. The upper housing is then placed over the lower housing and is secured to the lower housing.

The present invention allows a user to couple multiple electronic devices to a primary electronic device using a junction box that is easily configurable and that is inexpensive. The junction box of the present invention provides good electrical contact in environments that include moisture, dust and foreign particles.

These and other advantages of the present invention will no doubt become obvious to those of ordinary skill in the art after having read the following detailed description of the preferred embodiments that are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a perspective view of a junction box that is coupled to four electrical cables in accordance with one embodiment of the present invention.

FIG. 2 is a side view of a junction box that is coupled to four electrical cables in accordance with one embodiment of the present invention.

FIG. 3 is a top view of a junction box after the removal of the upper housing in accordance with one embodiment of the present claimed invention.

FIG. 4 is a cross sectional view along section A—A of FIG. 1 in accordance with one embodiment of the present claimed invention.

FIG. 5 is a diagram showing a system that includes a primary electronic device that is coupled to multiple electronic devices by a junction box in accordance with one embodiment of the present claimed invention.

FIG. 6 is a perspective view of a junction box with the upper housing removed in accordance with one embodiment of the present claimed invention.

FIG. 7 is a perspective view illustrating the seal formed by an upper seal and lower seal around an electrical cable in accordance with one embodiment of the present claimed invention.

FIG. 8 is a front view illustrating the seal formed by an upper seal and lower seal around an electrical cable in accordance with one embodiment of the present claimed invention.

The drawings referred to in this description should be understood as not being drawn to scale except if specifically noted.

BEST MODE FOR CARRYING OUT THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail as not to unnecessarily obscure aspects of the present invention.

FIG. 1 shows a junction box 1 that includes a housing assembly formed by lower housing 3 and upper housing 4. Primary electrical cable 5 extends through an opening in lower housing 3 and is adapted to couple to a primary electrical device using connector 7.

Continuing with FIG. 1, in one specific embodiment, connector 7 is a hermetic connector. Alternatively, a sealed connector that is not completely hermetic such as, for example a connector that complies with MIL C-26482 series II standard can be used. In one embodiment, primary electrical cable 5 is a hermetic cable. Alternatively a sealed cable that is not hermetic can be used.

Strain relief 6 of FIG. 1 forms a seal around primary electrical cable 5 and around the opening in lower housing 3 through which primary electrical cable 5 extends. Also, strain relief 6 protects primary electrical cable 5 from damage resulting from bending of primary electrical cable 5 near lower housing 3.

Continuing with FIG. 1, other electrical cables such as, for example, electrical cables 35–38 electrically couple junction box 1 with other electronic devices. In one embodiment, electrical cables 35–38 are sealed electrical cables that are moisture resistant. Alternatively, electrical cables 35–38 can be hermetic electrical cables. Examples of other electronic devices include PDS devices, buzzers, alarms, control devices and systems, etc.

As shown in FIG. 2, upper housing 4 extends on one side outward past the end of lower housing 3 so as to form an overhanging portion 20. Overhanging portion 20 creates an opening 21 through which cables 35–38 extend. Overhanging portion 20 shields opening 21 from entry of contaminants such as liquids, dust, dirt and foreign objects. In particular, opening 21 is shielded from downward moving contaminants such as, for example spills, rain, falling tools, falling dirt and other falling objects.

Continuing with FIG. 2, upper housing 1 includes a downward facing lip that keeps water, dirt, dust, and other foreign particles from entering into the interior of junction box 1. In one embodiment, upper housing 4 and lower housing 3 are made of plastic.

Referring now to FIG. 3, circuit board 10 is shown to be coupled to primary electrical cable 5 by connector 44 that mates with connector receptacle 46 disposed on circuit board 10. In one embodiment, circuit board 10 fits within slots disposed in lower housing 3. Connector receptacles 47–50 are also disposed on circuit board 10. In one embodiment, connector receptacles 47–50 are connector receptacles that are not hermetically sealed such as, for example serial port receptacles, DE-9 receptacles, etc.

Continuing with FIG. 3, connector receptacles 47–50 are electrically coupled to connector receptacle 46 for electrically coupling electrical cables 35–38 to primary electrical cable 5. More particularly, electrical cable 35 is electrically coupled to circuit board 10 by connector 40 that mates with connector receptacle 47. Electrical cable 36 is electrically coupled to circuit board 10 by connector 41 that mates with connector receptacle 48. Similarly, connector 42 mates with connector receptacle 49 for electrically coupling electrical cable 37 to circuit board 10. Also, connector 43 mates with connector receptacle 50 for coupling electrical cable 38 to circuit board 10.

Continuing with FIG. 3, wire connection receptacle 25 is coupled to primary electrical cable 5 via circuit board 10. Wire connection receptacle 25 is adapted to receive wires for coupling electrical devices and electrical circuitry to circuit primary electrical cable 5 and to electronic devices coupled to circuit board 10. In one embodiment, wire connection receptacle 25 is adapted to couple to electronic devices such as, for example, switches, remote controls, alarms, etc and is adapted to ground electronic devices.

Still referring to FIG. 3, lower seal 52 extends around the periphery of lower housing 3. Electrical cables 35–38 overlie lower seal 52. Openings, shown generally as opening 28 are adapted to receive cable ties (not shown) for holding cables 35–37 in place.

Referring now to FIG. 4, lower housing 3 and upper housing 4 form an enclosure 30. A seal assembly, formed by upper seal 51 and lower seal 52 fits around cable 35 and cables 36–38 of FIG. 3 to seal enclosure 30. The seal assembly formed by upper seal 51 and lower seal 52, in conjunction with overhanging portion 20 of upper housing 4 and the lip that extends around the sides of upper housing 4 prevent liquids, dust, dirt and foreign objects from entering enclosure 30.

Referring to FIGS. 3–4, enclosure 30 encloses circuit board 10. In addition, all of the electrical connections are disposed within enclosure 50. More particularly, connectors 40–44, connector receptacles 47–50, and circuit board 10 are disposed within enclosure 30.

Continuing with FIG. 4, in one embodiment, upper seal 51 that is attached to upper housing 4 is identical to lower seal 51 that is attached to lower housing 3. Upper seal 52 and lower seal 51 can be made of any flexible material that is moisture resistant. In one embodiment, lower seal 51 and upper seal 52 are made of a urethane material such as, for example, urethane foam. Alternatively, lower seal 51 and upper seal 52 are made of a silicon material such as, for example, silicon foam.

Referring now to FIG. 5, a system 500 is shown to include a primary electronic device that is a computing device 55. Computing device 55 is coupled to electronic devices 56–58 via junction box 1. More particularly, computing device 55, shown to be a laptop computer, is coupled to junction box 1 by primary electrical cable 5 and connector 7. Electronic devices 56–59 are coupled to junction box 1 by electrical cables 35–38 respectively.

Continuing with FIG. 5, computing device 55 is coupled to electronic devices 56–59 such that only one cable, primary electrical cable 5, couples to the back of computing device 55. Thus, system 500 of the present invention is easier to handle and easier to use than prior art systems that couple multiple cables to the back of the computing device.

Referring still to FIG. 5, in one embodiment, system 500 is a guidance control system that is adapted to indicate a travel path for a vehicle. In this embodiment, electronic devices 56–58 include a light bar 56, a tilt sensor 57, a communication device 58, and a Position Determination System (PDS) 59.

In one embodiment, PDS 59 is adapted to determine position using a Satellite Positioning System such as the U.S. Global Positioning System (GPS). In the present embodiment, reference to a position determination system herein refers to a Global Positioning System (GPS), to a Global Orbiting Satellite System (GLONASS), and to any other positioning system, including pseudolites and dead reckoning systems, that provide information by which an observer's position can be determined. The term "position determination system" and "PDS" as used herein, is intended to include pseudolite or equivalents of pseudolites, and the term "position determination system signals" and "PDS signals," as used herein, is intended to include position determination system like signals and data from pseudolites or equivalents of pseudolites. Also, signals from other sources such as LORAN, Wide Area Augmentation System (WAAS) satellites, etc. may be used to determine position. The position determination system may also provide information by which an observer's velocity and/or the time of observation can be determined.

In one specific embodiment in which satellites of the GPS are used to determine position, PDS 59 includes a PDS antenna, a PDS receiver, and a PDS processor. In one embodiment, the PDS processor is a GPS processor made by Trimble Navigation, Ltd. of Sunnyvale, Calif. In this embodiment, PDS antenna is an ACE II GPS™ antenna, manufactured by Trimble Navigation, Ltd. and the PDS receiver includes a SIERRA GPS™ chipset, manufactured by Trimble Navigation, Ltd. Although such a specific implementation is described, the present invention is also well suited to an embodiment having various other components and features.

In an embodiment in which system 500 of FIG. 5 is a guidance control system, tilt sensor 57 indicates the tilt of a vehicle., Computing device 55 uses the position determined by PDS 59 and the tilt received from tilt sensor 57 for computing a travel path for the vehicle. The use of tilt in allows for correction to travel path resulting from travel over sloped surfaces. The desired travel path is then visually indicated using light bar 58. In one embodiment, the desired travel path is indicated by engaging lights in said light bar to indicate deviation from the predetermined travel path. Alternatively, light bar 58 indicates the direction that the vehicle is to be turned in order to move the vehicle towards the desired travel path. The guidance control system of the present invention is particularly useful for precision farming applications.

Communication device 58 of FIG. 5 is adapted to couple information to computing device 55. Communications from communication device 58 can also be coupled to PDS 59 for use in position determination. In one embodiment, communication device 58 is a radio modem adapted to receive position information from other devices. This position information is then used by PDS 59 for more accurately determining position. Examples of methods that can be used for more accurately determining position include Real Time Kinematics methods, Differential GPS methods, etc.

Junction box 1 of FIGS. 1–5 is easily configurable to accept different input configurations. Different configurations are obtained by inserting a different circuit board 10 into junction box 1 that is adapted to receive the desired cables. The electrical cables that connect to the various electronic devices are then coupled to the new circuit board 10. The upper housing 4 is then placed over the lower housing 3 and is secured to the lower housing 3.

FIG. 6 illustrates an embodiment that includes connector receptacles 62–65 and wire receptacle 66 that are attached to circuit board 10. In one embodiment, connector 62 is a DE-9 connector receptacle and connector receptacles 63–66 are Small Computer System Interface (SCSI) receptacles. Connector 61 that is coupled to electrical cable 60, is adapted to couple to connector receptacle 64.

Now referring to FIGS. 7 and 8, lower seal 52 and upper seal 51 form a seal around electrical cable 60. The seal formed by lower seal 52 and upper seal 51 prevent fluid, dirt, dust and other foreign particles from entering into the interior of junction box 1.

In the embodiments shown in FIGS. 1–8, junction box 1 of the present invention forms an enclosure that protects the circuit board and all connectors and connector receptacles from the elements (e.g. fluids, dust, dirt and other contaminant particles). Because the junction box 1 of the present invention protects the circuit board and all connectors and connector receptacles, connectors and connector receptacles can be used that are not hermetic. This provides significant cost savings over prior art devices that require hermetic connectors and/or hermetic connector receptacles.

Junction box 1 of FIGS. 1–8 is splash proof and is rugged. Though junction box 1 is not hermetically sealed, the seal is sufficient to prevent fluids, dust, dirt and other contaminant particles from interfering with the operation of junction box 1. Because junction box 1 of the present invention does not have a hermetically sealed enclosure, junction box 1 is less expensive than prior art devices that require hermetically sealed enclosures. In addition, because all connectors and connector receptacles are contained within the housing formed by lower housing 3 and upper housing 4, the present invention is more robust than prior art systems that include hermetically sealed connectors that are outside of the junction box. For example, when a hermetically sealed connector of such a prior art system is stepped on, the connector and/or the connector receptacle is often damaged, resulting in a short or electrical failure. In contrast, the connectors and connector receptacles of the present invention are protected by the housing. Thus, when the housing of the present invention is stepped on, no damage results.

Junction box 1 of FIGS. 1–8 allows for easy access to connections. That is, connectors and wires that are coupled to circuit board 10 can be easily accessed. In an embodiment where screws are used to secure upper housing 4 to lower housing 3, the screws are removed and upper housing 4 is removed to provide access to connections. Thus, junction box 1 of FIGS. 1–8 is significantly easier to access than prior art systems that are hermetically sealed.

The present invention allows a user to couple multiple electronic devices to a primary computing device using a junction box that is easily configurable and that is inexpensive. The junction box of the present invention provides good electrical contact in environments that include moisture, dust and foreign particles.

The present invention is particularly useful in precision farming applications, allowing a computing device to be conveniently located, moved around, handled, etc, within the cab of the vehicle. With only a single cable going to the computing device, attempts to move, handle, or otherwise use the computing device are unencumbered and do not result in tangling of cables, failures, disconnects, etc. as typically occur when using prior art systems. Also, in precision farming applications, spills of fluids, rain, moisture, dust, dirt and other contaminant particles are common. The present invention provides an apparatus that is resistant to these harmful elements and that is less expensive than a hermetically sealed system.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, to thereby enable others skilled in the art to best utilize the invention and various embodiments with various modifications suited to the particular use contemplated. It is intended that the scope of the invention be defined by the Claims appended hereto and their equivalents.

What is claimed is:

1. A junction box comprising:
   a housing assembly including an upper housing and a lower housing, said upper housing coupled to said lower housing so as to form an enclosure therebetween and so as to form a first opening therebetween, said upper housing extending outward on one side so as to form an overhanging portion that includes a downward extending lip, said overhanging portion forming a channel that extends from said first opening and that is open to the bottom side of said junction box, said overhanging portion at least partially shielding said first opening from entry of contaminants;
   a primary electrical cable for coupling said junction box with a primary electronic device; and
   a circuit board disposed within said enclosure and coupled to said primary electrical cable, said circuit board adapted to be coupled to electrical cables that extend through said first opening.

2. The junction box of claim 1 further comprising a seal assembly disposed between said lower housing and said upper housing so as to form a seal therebetween.

3. The junction box of claim 2 wherein said seal assembly further comprises a first seal and a second seal.

4. The junction box of claim 3 wherein said upper housing includes a second opening adapted to receive said primary electrical cable.

5. The junction box of claim 3 wherein said upper housing and said lower housing are comprised of plastic.

6. The junction box of claim 1 wherein said lower housing includes a slot adapted to receive said circuit board.

7. A junction box comprising:
   a housing assembly including an upper housing and a lower housing, said upper housing coupled to said lower housing so as to form an enclosure therebetween and so as to form a first opening therebetween, said upper housing extending outward on one side so as to form an overhanging portion that includes a downward extending lip, said overhanging portion forming a channel that extends from said first opening and that is open to the bottom side of said junction box, said overhanging portion at least partially shielding said first opening from entry of contaminants;
   a circuit board disposed within said enclosure;
   a primary electrical cable coupled to said circuit board and extending through a second opening in said housing assembly for coupling said junction box with a primary electronic device;
   a seal assembly disposed between said lower housing and said upper housing so as to form a seal therebetween; and
   a plurality of electrical cables extending through said first opening and into said enclosure, said plurality of electrical cables coupled to said circuit board so as to provide electrical connection to other electronic devices.

8. The junction box of claim 7 wherein said seal assembly further comprises a first seal and a second seal.

9. The junction box of claim 7 wherein said lower housing includes a slot adapted to receive said circuit board.

10. The junction box of claim 7 wherein said upper housing and said lower housing are comprised of plastic.

11. The junction box of claim 7 further comprising:
    a plurality of connector receptacles disposed on said circuit board and electrically coupled to said primary electrical cable.

* * * * *